Sept. 13, 1932.  J. L. ANDERSON  1,877,621
MANUFACTURE OF WELDED PIPE
Filed Dec. 10, 1928
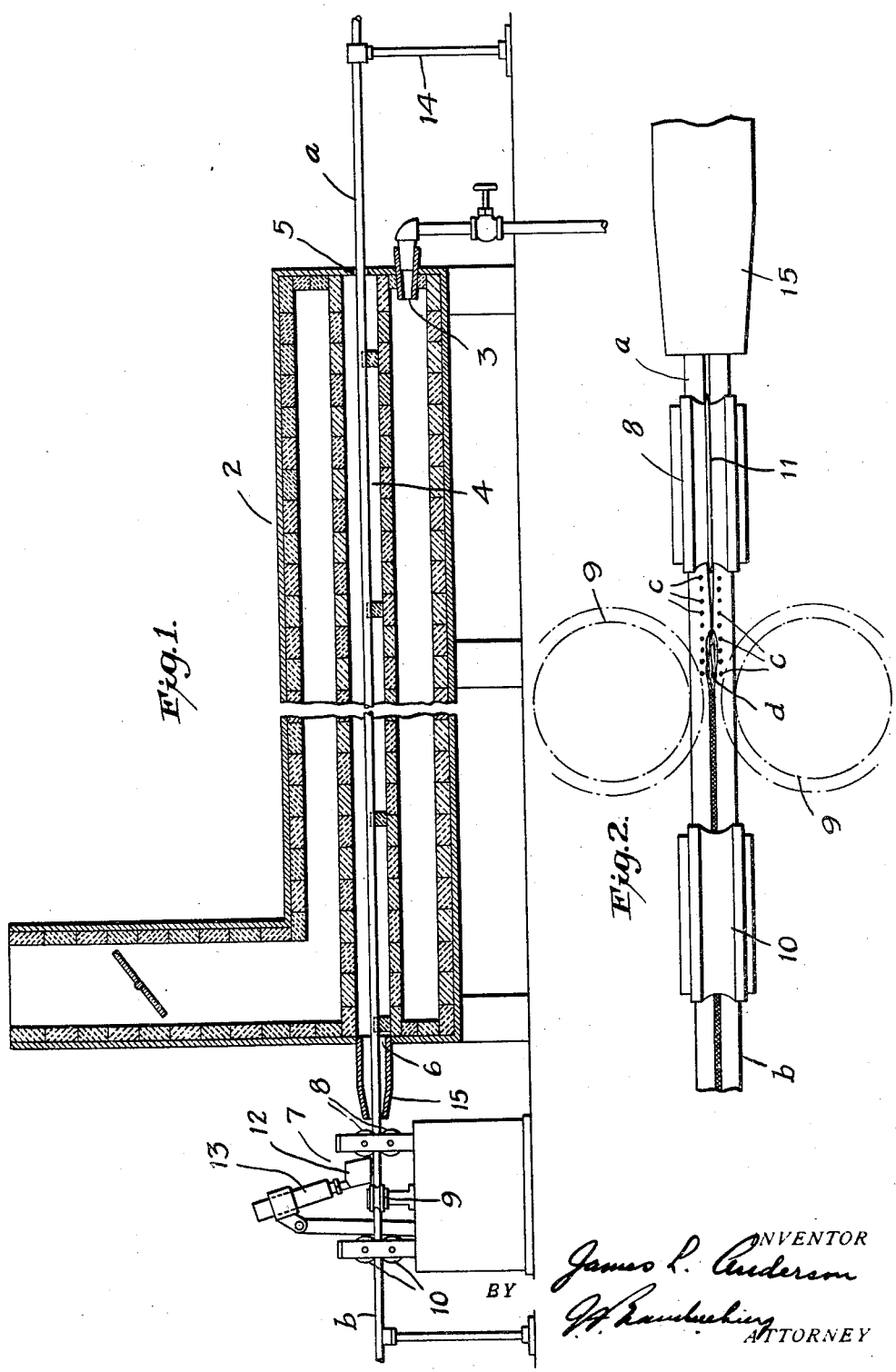

Patented Sept. 13, 1932

1,877,621

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

MANUFACTURE OF WELDED PIPE

Application filed December 10, 1928. Serial No. 325,093.

The invention relates to the manufacture of welded pipe and tubing.

One of the objects of the invention is to produce superior butt-welded, heavy-walled steel and iron pipe or tubing rapidly and economically, and in such a manner as to obtain smooth and perfect welds which are of comparable strength with, or of greater strength than, the pipe itself.

The process of this invention is of special advantage for the production, at low cost, of butt-welded, heavy-walled pipe in the smaller sizes which have heretofore been the most difficult to make and which have yielded the least profit or caused the heaviest losses to manufacturers.

Pipe of this class includes pipe used for the transmission of fluids, such as steam, water, air, gas, etc., domestic installations and the like. Such pipe is usually measured by inside diameter and referred to wrought-iron pipe sizes. My process is well adapted for extremely economical manufacture of the small and medium sizes from ⅛ inch inside diameter up to 4 inch inside diameter, having a wall thickness ranging, usually, from about $\frac{3}{32}$ inch to about ¼ inch, though this range is not intended to be limiting since the process may be applied to the manufacture of pipe or tubing of larger sizes if desired, and to tubing irrespective of the purpose for which it may be used.

For commercial purposes, welded pipe of the kind indicated has been produced almost entirely by the furnace and pressure welding method. According to one procedure, flat skelp strips of limited length, after being heated in a furnace slightly above the welding point, are drawn through a bell or die, or through a succession of such agencies, whereby the strip is formed into tubular shape and its edges are closed and united together by heavy pressure. In another mode of manufacture, rolls have been employed for forming and welding the tubes from strips heated in the furnace. It is also known to bend the skelps into U-shape or into unclosed tubular form before introducing them into the furnace. Pipe has also been manufactured in continuous process by unreeling a flat strip of indefinite length, passing it through a furnace where it is gradually brought up to welding temperature, and thence through forming and welding rolls.

Instead of heating the metal in the furnace to or above the point at which its edges will unite under pressure, it is likewise known to heat it to a lower temperature in the furnace and to apply a blast of air or oxygen to the edges of the skelp before they are forced together. In this way the temperature of the edges can be raised sufficiently to unite under pressure, but at the expense of the metal itself, the rise in temperature being due to rapid oxidation. The process is of necessity a delicate one and the welds are apt to be of uncertain quality.

In welded pipe or tubing made in any of these ways, the welds produced are adhesion welds, as is evidenced by the fact that when such a weld is broken it usually shows the original plane or surface of the metal.

While such methods of manufacture have been developed to greater or less degree in different plants, it remains generally true that the welds thus produced are not only likely to be of less than full strength, but are also subject to much imperfection. This welding state of iron or steel is one that exists within a strictly limited range of temperature, and it is therefore necessary for the operator to gauge the condition of the hot metal accurately by appearance as it is withdrawn from the furnace and before it is introduced to the bell or rolls. If the degree of heating has been a little too low, the edges will not unite however great the pressure, while if it has been a little too high the steel is burnt, or if not burnt it is often soft enough to buckle in the die or rolls. The edges are frequently misalined, and there may be a good deal of flash on the inside. Error in judgment, which often occurs, results in failure of the welding operation and causes a large amount of waste.

In the usual case, where an air or oxygen blast is not applied to the edges of the skelp after leaving the furnace, the skelp, whether flat or bent, must be heated sufficiently above the welding point in the furnace to allow for some loss of heat before it is actually welded. A great deal of the pipe thus made is burnt to such an extent that the metal is greatly weakened and the pipe will not withstand bending.

In the ordinary furnace and pressure welding methods, it is common to reheat the welded pipe and to repass it, one or more times, through dies or rolls in order to condense the metal and increase the strength of the weld. Such reheating and repassing naturally increase the cost of the product.

The temperature to which the metal is heated causes it to be attacked by the oxygen of the air on emerging from the furnace, if it has not already been oxidized therein, and the presence of oxide is always an obstacle to welding by hammering or by pressure.

The oxyacetylene flame has been used to a large extent for fusion welding of the longitudinal seams of light-gauge tubing, or tubing the wall of which is thin in comparison to the diameter, and also for welding the seams of special tubular articles, but the cost of the process has been prohibitive, in competition with the furnace method, for the welding of pipe or tubing of small size and heavy walls, or pipe the walls of which are thick in relation to the diameter. Such products have to be made in large quantities to sell at a low price, and the linear speed of oxyacetylene welding as heretofore practiced is entirely too slow when applied to heavy-walled pipe and tubing. Oxyacetylene welds when properly made are greatly to be desired, because the parts are actually fused together in a strong, homogeneous union, in contradistinction to the adhesion weld obtained with the furnace and pressure welding method, and because they are not brittle like electric welds. Furthermore, whereas, with the usual furnace methods, there is likely to be failure of the edges to unite properly at one or more regions, necessitating the scrapping of a large amount of the product, the oxyacetylene process affords much greater certainty of perfect welding because it is not dependent on heating the strip or unclosed tubing to a critical state in a furnace and thereafter forcing the edges together to cause them to unite, and because the welding operation is visible and readily controllable.

The purpose of this invention is to attain high linear speeds of welding and very moderate gas consumption, and thereby great economy, as compared with what has been possible heretofore with oxyacetylene welding for this class of work. As compared with the ordinary furnace and pressure welding method, important objects are to effect the almost total elimination of costly scrap, to obtain stronger and better welds, and to produce stronger and more perfect pipe and tubing.

These results and advantages are secured by putting into the skelp, while moving at considerable speed through an enveloping heating medium or furnace, most of the sensible heat necessary for welding, and then by the oxyacetylene or other high temperature oxy-fuel-gas flame introducing into the edges and the adjacent metal at each side of the seam a sufficient additional amount of heat progressively, uninterruptedly and rapidly to fuse together these regions in a linearly extending puddle which penetrates the thickness of the metal and is of substantial width. In this way a superior fusion weld can be made as fast as the metal can be heated in the furnace, and more perfect pipe and tubing is produced because of the good penetration, and because there is little apparent evidence of the weld, and no projection on the interior, if the conditions are properly controlled, and also because there is no likelihood of burning. The quality of the weld, and the excellence of the penetration, is contrary to what might be expected from operating at such speeds with pipe of the wall thicknesses contemplated. This may be attributed to the fact that the solid metal which will confine the molten puddle is already so close to the temperature of fluidity that heat conduction loss at the time of welding is very greatly minimized and, also, that the molten state exists for a long enough time to insure the weld being carried through and involving a substantial width.

Directly beyond the welding region, at a point where the weld has already been made by flowing together of the molten metal, the pipe is subjected to moderate pressure transverse of the weld, for the purpose of improving the weld and bringing it up substantially to the full round of the pipe. This operation is accompanied by some reduction in diameter, the metal in the weld being still somewhat plastic where it is thus compressed. Thereafter, the welded pipe passes through sizing rolls, and the product is finished except for cutting it to desired lengths.

The process is virtually a continuous one, tube blank after tube blank being passed through the heating and welding regions in succession. While I prefer to operate with pre-formed long lengths of bent skelp or open-seam tubing, I do not exclude operating with flat skelp, or flat strips of indefinite length, and forming the same into tubular shape on leaving the furnace and before being welded, in which case the tubular shape can be passed through a short reheating zone, if desired, just before it reaches the welding flame. Nor do I exclude forming flat strip into unclosed tubular form in continuous process before entering the furnace.

In contradistinction to ordinary oxyacetylene tube welding practice, my plan for welding heavy-walled pipe or tubing is to heat the skelp or the pre-formed open-seam pipe or tubing above a bright red heat or not far below the fusion welding point, by furnace heat, and thereupon by means of a group of oxyacetylene or other high temperature oxy-fuel-gas flames to introduce locally and quickly only the amount of additional heat necessary to bring the desired regions up to fusion and to melt them together. It would not be desirable to heat the skelp in the furnace to the verge of melting and add substantially only the latent heat of fusion by the high temperature flame jets, first because of the danger of burning, and second because of the difficulty of handling, steel being unlike ice in that there is not a sharp change from the solid to the liquid state but a transition through an increasingly plastic condition. As an example of preferred practice, excellent results can be secured when the metal of the blank leaves the furnace at a temperature around 2000° F.

I prefer to heat the metal in a furnace where the atmosphere or gases to which the metal is exposed are nonoxidizing. Then, owing to the quickness with which the material travels from the exit opening of the furnace to the welding flames, and the protective reducing atmosphere of the envelope gases of the welding flames, a weld is obtained without hindrance of oxide.

With the skelp or blanks heated within this upper range of temperature approaching but sufficiently below the fusing point, the possible linear speed of welding by means of the oxyacetylene flame can be increased enormously over what would be possible either without furnace preheat or with only moderate preheating. At the same time, the depth, width and strength of the weld can be increased notwithstanding that the consumption of oxygen and fuel gas is very low.

Under these conditions it is only necessary to provide a long enough furnace to allow for a sufficient time element in this stage of the process, or otherwise to insure the necessary high temperature in the skelp before it emerges from the furnace at the speed at which it is moved. Whereas the power of the welding torch or torches and the quantities of gases which it was permissible to burn, were heretofore the limiting factors in speed of welding, my invention transfers the burden to the furnace, and I find that the torch can weld pipe economically as fast as the furnace can heat it, with a consumption of expensive gases which decreases per unit of product as the speed increases.

According to the preferred mode of carrying out my invention, open-seam heavy-walled pipe or tubing is first made or provided, and is cut to lengths as long as will permit of handling, preferably fifty feet or over. These lengths are considerably greater than it is possible to employ with the usual furnace method. By producing these tubular blanks from flat skelp or strip by forming cold, or at a low heat, in a multi-roll forming mill, perfectly formed open-seam pipe can be obtained, with the edges in exact relation for subsequent abutment and welding. Furthermore, the tubular form is convenient for handling and passing through a long furnace.

This passing of the open-seam lengths through the furnace can be readily accomplished by hand, without requiring special skill on the part of the operator, since the precise rate or evenness of movement through the furnace is not vital, and since after the first tube has been put through and entered into the rolls of the welding machine the rate at which each succeeding tube is advanced by the workman is regulated for him by the rate at which the preceding tube is being forwarded by the welding machine; in other words, he pushes each length through the furnace immediately following a length ahead and can not push it any faster than the movement of that length will allow. It is desirable to provide guides in the furnace so that the succession of lengths are kept in alinement. Naturally, mechanical means might be provided for feeding the tubular blanks into and through the furnace, until they are taken and forwarded by the welding machine.

The highly heated blanks on leaving the furnace enter the rolls of an oxyacetylene welding machine, with a fin roll guiding the seam under the torch or torches. The torch or torches employed are of a character to deliver a multiple-jet flame, or group of flames, extended for a distance lengthwise of the seam, and preferably spread transversely thereof so that the high temperature jets strike the metal somewhat back of the edges as in my Patents 1,402,996, 1,402,997 and 1,516,486.

The final set of rolls of the welding machine are designed and adjusted to act as sizing rolls.

The accompanying drawing illustrates schematically means for carrying out the process, Fig. 1 being a view partly in side elevation and partly in vertical section, with intermediate portions broken away, and Fig. 2 being a plan view of a part of the equipment on a larger scale, the material being represented in progress through the steps of the process in both views.

The numeral 2 designates a furnace of small cross-sectional area and very considerable length, preferably forty feet or more. The furnace may be fired with either gas or oil, a gas burner 3 being indicated. The blanks *a* to be welded preferably travel through a space 4 of the furnace where they do not come in contact with the flame.

The furnace has small openings 5 and 6 at its opposite ends for the entrance and exit of the skelp, and since it does not have to be opened a constant, substantially non-oxidizing atmosphere can be maintained. A reducing gas may be supplied to the muffle 4 if desired, or, if the furnace is not a muffle furnace, an inert atmosphere can be secured by proper furnace design and by regulation of the combustion.

Close in front of the furnace, that is to say adjacent the exit opening 6 there is placed an oxyacetylene welding machine 7, comprising a pair of rolls 8, on horizontal axes, a pair of rolls 9 on vertical axes, and another pair of rolls 10 on horizontal axes. All of these rolls may be understood as being power driven. The upper roll of the first pair of rolls 8 is split and contains a thin guiding fin 11, which enters the open seam of the unclosed tube, as it approaches the oxyacetylene heating and welding flame or flames. The flame is delivered from a multiple jet tip 12 of a torch 13, which is suitably supported above the traveling pipe or tube.

The group of flame jets *c* delivered from the tip extends lengthwise of the seam for a distance of preferably about six inches or more, and may also be spread transversely of the seam, as in my patents previously referred to, and is adapted to bring the highly heated, fast traveling metal of the edges and adjacent portions of the skelp quickly up to fusion, and to produce an elongated puddle *d* of molten metal extending for a few to several inches lengthwise of the seam where the edges are in contact. The portions of the blanks at opposite sides of the seam thus melted flow together, producing an integral, homogeneous union, which by proper regulation can be made coextensive with the depth or thickness of the wall of the pipe, so as to leave little or no crevice outside or inside, and on the other hand, little or no projection on the inside to obstruct the flow of fluid when the finished pipe is put into use. The weld which is produced is approximately as wide on top as the thickness of the wall of the pipe, and tapers downward to the bottom.

Instead of a single multiple jet torch tip, two or more such tips or torches may be arranged in tandem.

The last of the welding jets is close behind the bite of the pair of rolls 8, and the area of intense heating extends from this point rearwardly as far as may be necessary to bring the metal up to fusion and to produce the body of molten metal which forms the weld. For uniformity, "forward", "in front", "rearward" and "behind" and similar expressions are used herein in the sense that "forward" or "in front" means ahead in the direction in which the pipe is moving, while "rearward" or "behind" means farther back toward a place from which the pipe or blank is traveling.

The rolls 9 apply pressure to the pipe at a point where the molten metal has solidified and the weld has already been made but is still somewhat plastic. Their function is to cause the seam edges to come together, or almost together, where the weld is made, and immediately thereafter to work the weld to an extent and to squeeze it sufficiently so as to eliminate or practically eliminate any depression on top. A raised weld is not particularly sought, but if some elevation is produced it is not objectionable and will be substantially removed in the embrace of the rolls 10, which are so set and adjusted as to serve as finishing and sizing rolls.

In passing through these rolls the welded pipe or tube *b* is reduced in diameter so that when it is delivered and cools off it is of the desired size.

The strips which are bent or curved to form the unclosed tubular shape which is welded are slightly wider than would otherwise be required in order to allow for some loss in diameter as the result of melting and flowing together the metal at opposite sides of the seam and then compressing the weld so as to insure an adequately full section.

In the particular carrying out of the invention which is illustrated, the strips are made into open-seam blanks or bent skelps in a suitable forming mill, in lengths as long as will permit of handling, but this need not be the fact in all instances.

A tubular blank is moved endwise by hand or otherwise while resting on suitable supports 14 and its forward end is introduced through the rear opening 5 of the furnace. It is advanced at a more or less even rate through the furnace until its front end comes out through the opening 6 and is advanced into the grip of the rolls of the welding machine by which it is driven, its unclosed seam being accurately guided with respect to the heating and welding flame jets by the fin 11. The welded tube is delivered as a finished product requiring only to be cut as desired.

A tubular member 15, tapered toward its forward end, may be arranged to project from the furnace around the exit opening 6. Such an extension serves as a guide to aid in conducting the blanks properly to the first set of rolls of the welding machine, and will also protect them from the outside atmosphere in the space interval between the front of the furnace and the welding machine.

The ends of successive blanks may be tack welded together, so that after the first length has been passed through the furnace an operative at the rear end may be relieved of the duty of pushing the blanks through the furnace. Finally, in order to relieve the blanks of strain when highly heated in the furnace, mechanical means may be provided at the rear of the furnace for propelling the blanks in unison with the pull exerted by the welding machine.

The furnace is of such length that the skelp or blanks, traveling at the desired speed, can be brought progressively to the suitably high temperature by the time each portion of it leaves the furnace. For example, with a furnace approximately forty feet in length, and an exit temperature of the metal in the neighborhood of 2000° F., heavy-walled pipe can be passed through the furnace at speeds of about forty to fifty feet per minute, and can be welded at those speeds, with very moderate consumption of oxygen and acetylene, so as to obtain a superior product. Without the furnace and with the same consumption of gas per unit of time, the linear welding speed for similar pipe would be about 1½ feet per minute. The best speed that I know of as having been reached in oxyacetylene fusion welding of pipe of this class, where the torch was expected to do all the work, and where large amounts of the gases were burned, is about 3½ feet per minute.

The term "skelp" is used herein in a general sense to include flat or bent strip, or unwelded tubular blanks, from which the welded pipe or tubing may be made.

As compared with ordinary oxyacetylene tube welding, my process gives greater and more perfect control of the seam up to the welding point, because the thorough preheating removes all tendency of the metal to spring. The perfection of the welding and the absence of imperfectly butted edges is of great advantage for subsequent threading or other machining operations. Generally speaking, my process affords accurate production with lowest cost raw material.

I am also aware of the Ostermann Patent #1,076,641 of October 21, 1913, which shows a small furnace incorporated in a welding machine. The tube to be welded is said to be heated to "a certain, not too high temperature," namely, a slight red heat, which is entirely too low for my purpose, and the method of welding is quite different from the one I employ, in that the torch flame, which is evidently only a single jet, is caused to act on and between the edges while they are held apart, rendering them sticky or at most producing a condition only of surface fusion, the weld being formed by then pressing the edges together. I do not exclude, however, a known modification of the melt weld process wherein the edge regions are melted by the high temperature flames before the edges come into actual contact, the operation being so conducted that this melted metal flows and bridges across the slight gap from both sides. In such a case, the melting may be continued where the edges would otherwise come together, or the weld may be produced substantially entirely by the bridging and mingling of the melted portions, the weld being thereafter squeezed up to a sufficient height.

An important feature in connection with the process is that unconsumed envelope gases of the welding flame, rich in hydrogen or carbon monoxide (in the case of the oxyacetylene flame, more particularly the former) are caused to enter through the unclosed seam of the pipe or tube immediately adjacent the welding point and to fill the interior, flowing through the same in both directions. The gases pass through the welded portion of the pipe in the direction in which it is traveling and burn as they emerge at the forward end. This deoxidizing gas acts upon the entire interior surface of the highly heated and welded tube, removing scale and oxide and leaving the surface bright and clean.

Some of the reducing gas flowing through the unclosed tube into the furnace may serve to produce, or contribute to, a non-oxidizing or reducing atmosphere therein.

I claim:

1. The method of manufacturing butt-welded pipe and tubing, which comprises rapidly moving the material through a longitudinal course, supplying heat to the material throughout a lengthy section of its course so that the material is brought to a temperature of the order of 2000° F., then as the material proceeds, and by means of a seamwise extended oxyacetylene flame agency, putting sufficient additional increments of heat into the contiguous edges and adjacent metal on either side of the seam so that the metal is melted throughout its thickness, thereby producing an elongated puddle in the hot pipe wall, causing this puddle to partly solidify and form a homogeneous part of the wall, and while the metal is still plastic exerting compression thereon to work the fused metal.

2. The method of manufacturing butt-welded pipe and tubing, which comprises moving the material through a longitudinal course at a rate of 40–50 feet per minute, supplying heat to the material throughout a section of its course extending for 40–50 feet therealong until the material is brought to a temperature of the order of 2000° F., then as the material proceeds, and by means of a seamwise extended oxyacetylene flame agency, putting sufficient additional increments of heat into the contiguous edges and adjacent metal on either side of the seam so that the metal is melted throughout its thickness, thereby producing an elongated puddle in the hot pipe wall, and causing this puddle to solidify and form a homogeneous part of the wall.

3. The method of manufacturing butt-welded pipe and tubing, which comprises rapidly moving the open-seam stock through a longitudinal course, progressively preheating the stock in its lengthwise course and while in a non-oxidizing atmosphere up to above a bright red heat and short of the fusion welding point, and then by means of a seamwise extending oxyacetylene flame agency, putting sufficient additional increments of heat into the contiguous edges and adjacent metal on either side of the seam so that the metal is melted throughout its thickness, thereby producing an elongated puddle in the hot pipe wall whilst reducing gases from the flames are caused to fill the interior of the red-hot tube, and permitting this puddle to solidify in a homogeneous weld.

JAMES L. ANDERSON.